United States Patent [19]

Wilkinson et al.

[11] Patent Number: 5,602,850
[45] Date of Patent: Feb. 11, 1997

[54] HIGH-SPEED PACKET BUS

[75] Inventors: Ian Charles K. Wilkinson, Newark; Kingston Duffie, Palo Alto, both of Calif.; Michel Laurence, Montreal, Canada

[73] Assignee: DSC Communications Corporation, Plano, Tex.

[21] Appl. No.: 324,144

[22] Filed: Oct. 17, 1994

Related U.S. Application Data

[63] Continuation of Ser. No. 15,695, Feb. 9, 1993, abandoned.

[51] Int. Cl.⁶ .................................................. H04L 12/40
[52] U.S. Cl. .................... 370/402; 307/147; 375/260; 364/935.46
[58] Field of Search ..................... 370/85.1, 85.9, 370/85.3, 85.5, 85.13, 60, 94.1; 375/357, 259, 260; 307/147; 333/1, 260; 364/DIG. 1, 935.46, DIG. 2

[56] References Cited

U.S. PATENT DOCUMENTS

| | | | |
|---|---|---|---|
| 4,862,451 | 8/1989 | Closs et al. | 370/85.1 |
| 4,955,020 | 9/1990 | Stone et al. | 370/85.9 |
| 5,001,704 | 3/1991 | Narup et al. | 370/85.9 |
| 5,029,124 | 7/1991 | Leahy et al. | 370/85.1 |

Primary Examiner—Wellington Chin
Assistant Examiner—Huy D. Vu
Attorney, Agent, or Firm—Baker & Botts, L.L.P.

[57] ABSTRACT

A high-speed bus system for a computer is constructed of a network of buses with parallel bit lines, each bus of which operates independently and supports serial packet communications, wherein transmit agents and receive agents associated with each communicating element in the bus system are connected to the bus system. Each transmit agent controls a single bus for transmission and each receive agent is connected to all other buses for reception in a diagonal topology. The architecture is based on use of a buffering element at each node in the bus structure, herein referred to as a cell bus interface (CBI) unit. Based on header data containing address information appended as part of a packet cell by a transmitting transmit agent, each receive agent decides whether the information provided on any bus is intended for it as a destination agent.

10 Claims, 12 Drawing Sheets

Set up time is – 25 nS minus:
· clock to output delay of counter
· multiplexer delay
· routing delay
· negative clock skew and shorter than 50% duty cycle

RECEIVER MEMORY INTERFACE TIMING DIAGRAM AND LOGIC

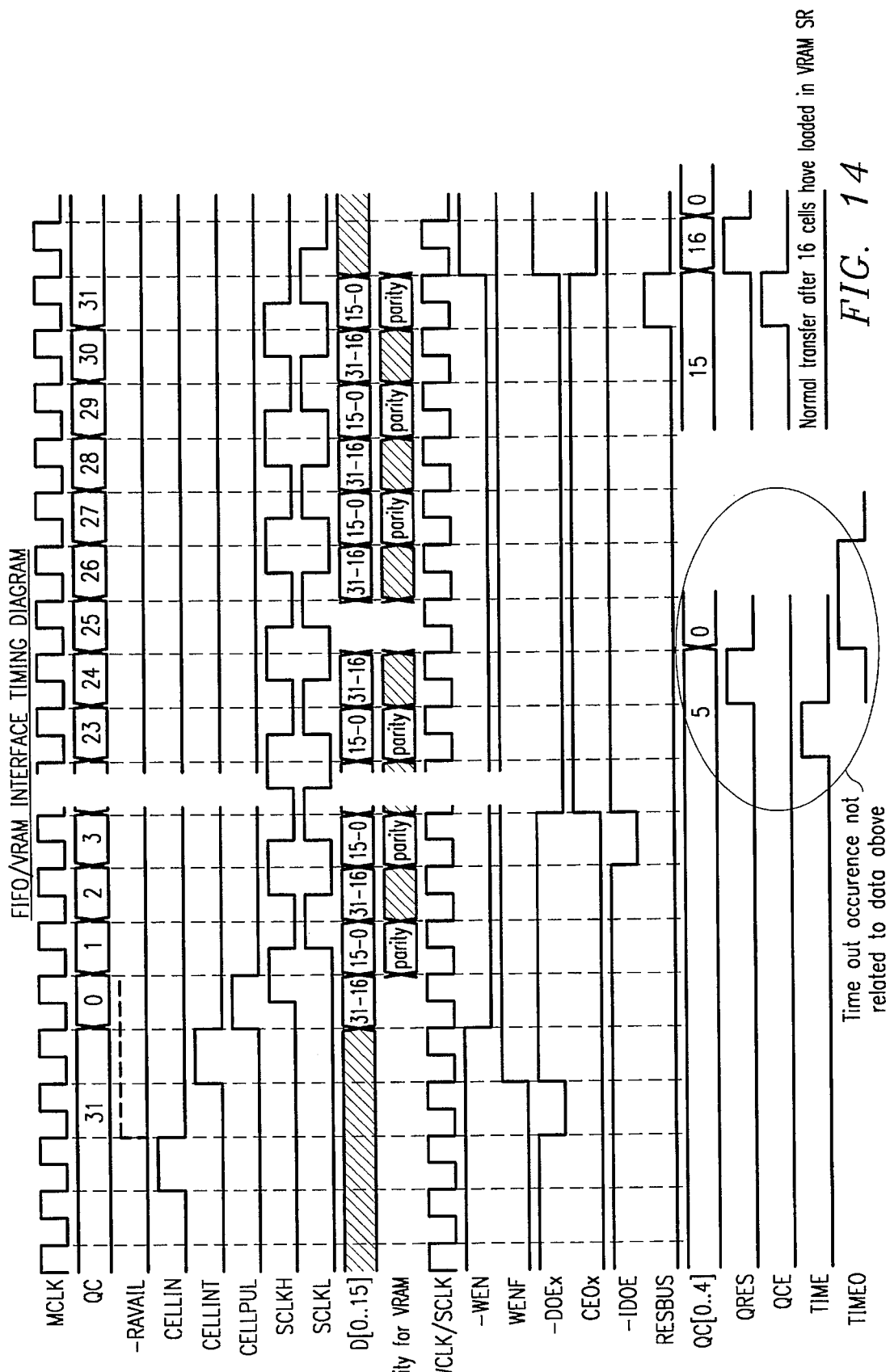

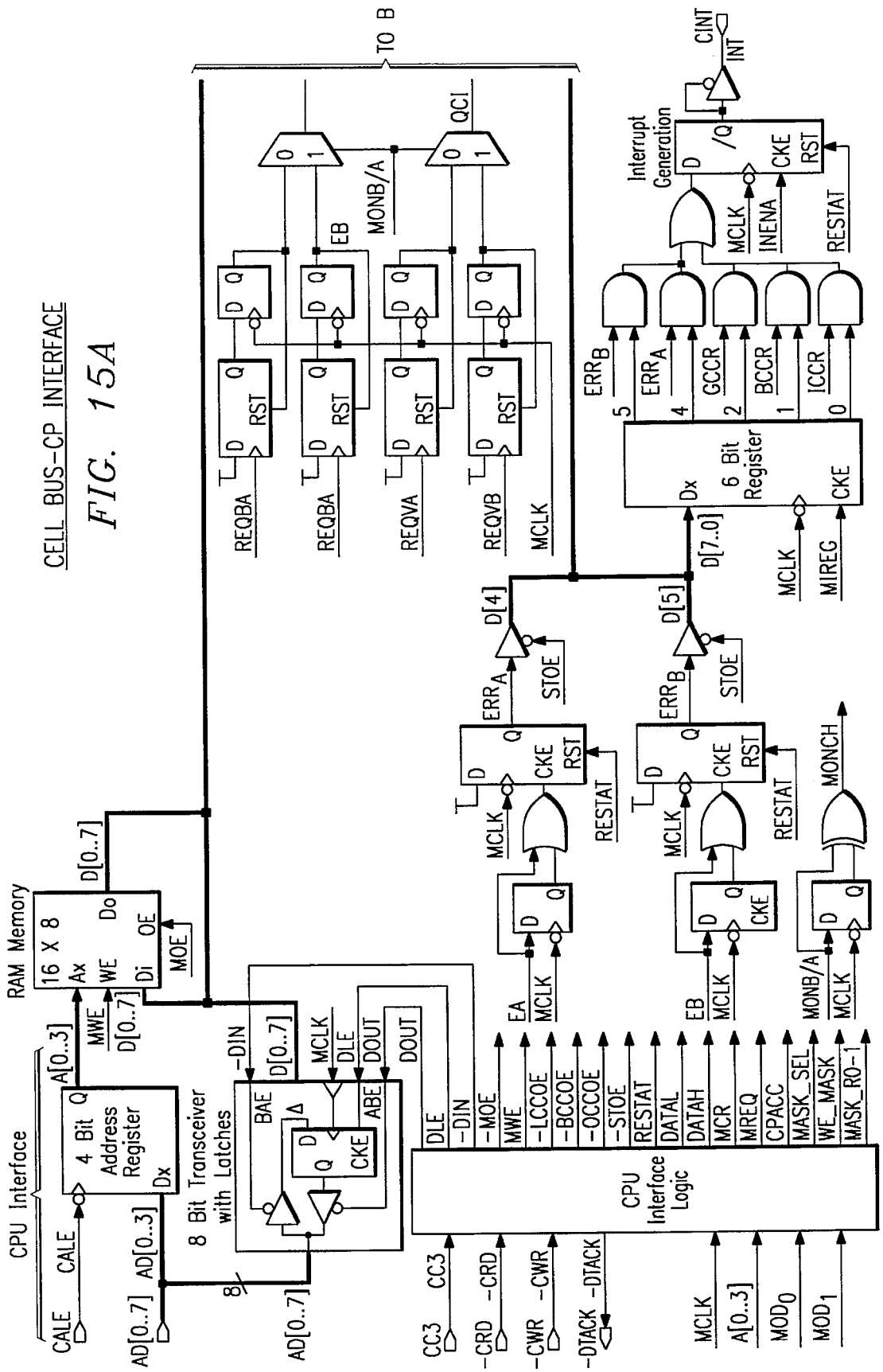
FIG. 15A CELL BUS-CP INTERFACE

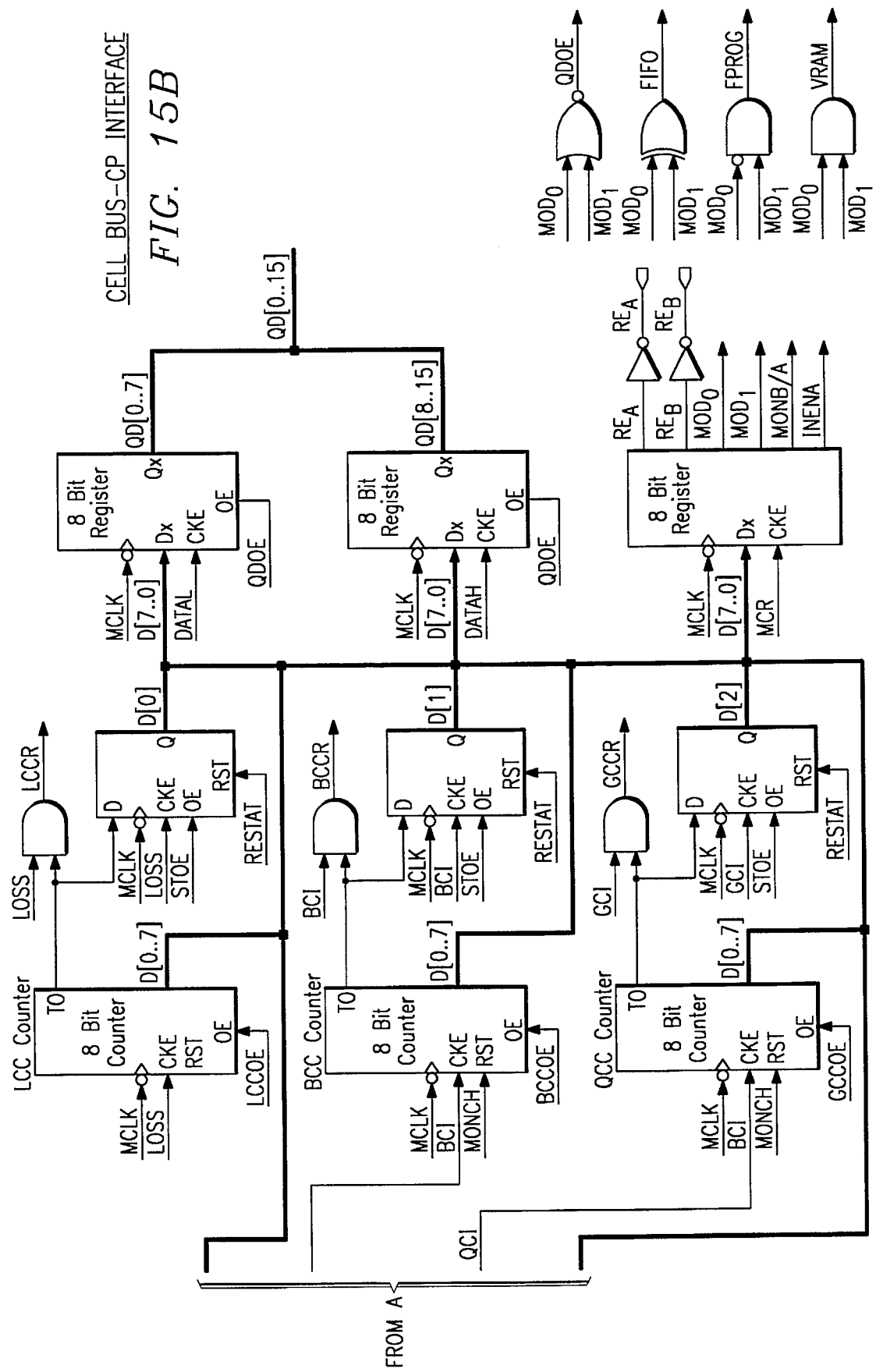

HIGH-SPEED PACKET BUS

This is a continuation of application Ser. No. 08/015,695 filed Feb. 9, 1993 now abandoned.

BACKGROUND OF THE INVENTION

This invention relates to intracomputer communications architectures and more particularly to bus structures of specialized computer systems. Specifically the invention relates to computer systems useful in telecommunications systems which require real-time routing and switching of digitized traffic. A particular application is in the field of ISDN data switching at telephone central offices.

There is a need for a high-speed bus for a telecommunications switch for digital communication applications wherein the primary usage is switching data between an external source or input resource and an external output or destination resource. Known bus topologies assume that communications of input resources and output resources is primarily with a central processing unit and not with one another. Addressing schemes are typically based on references to memory space associated with the central processing unit. As a consequence, the special problems associated with high-speed communication between resources have not been fully considered or addressed.

One issue is availability. A failed receiver on a bus can effectively destroy a bus. In a digital telephone switch, peak data rate or loading is a primary design issue. Data cannot be lost or delayed excessively even under peak load conditions.

What is needed is a bus topology and input/output structure which is capable of receiving, buffering and forwarding digital information with a minimum of delay even under extreme loading conditions.

SUMMARY OF THE INVENTION

According to the invention, a high-speed packet bus system for a computer is constructed of a network of buses with parallel bit lines termed cell buses, each cell bus operating independently and supporting word-wide serial packet communications, wherein transmit agents and receive agents associated with each individual communicating element in the bus system are connected to the bus system. Each transmit agent controls a single bus for transmission and each receive agent is connected to all other buses for reception. A diagonal bus topology is employed with transmit agents at one end and terminations at the other end. The architecture is based on use of a buffering element at each node in the bus structure, herein referred to as a cell bus interface (CBI) unit. Based on header data containing address information appended as part of a packet cell by a transmitting transmit agent, each receive agent decides whether the information provided on any bus is intended for it as a destination agent.

Further according to the invention, the CBI unit comprises four self-contained modules interacting to service a cell bus port pair, to access specialized data storage and to communicate with a control and programming central processing unit (CP). The CBI unit, constructed as a single VLSI device, comprises a pair of identical cell bus front end modules, a FIFO/VRAM output control module and a CP interface, control and status module.

The invention will be better understood upon reference to the detailed description in connection with the accompanying drawings.

BRIEF DESCRIPTION OF THE DRAWINGS

FIG. 14 is a timing diagram for a FIFO/VRAM interface;

FIGS. 15A–B illustrate a block diagram of a Cell Bus CP Interface Module; and

DESCRIPTION OF THE PREFERRED EMBODIMENT

Bus System Structure

Figure 1:
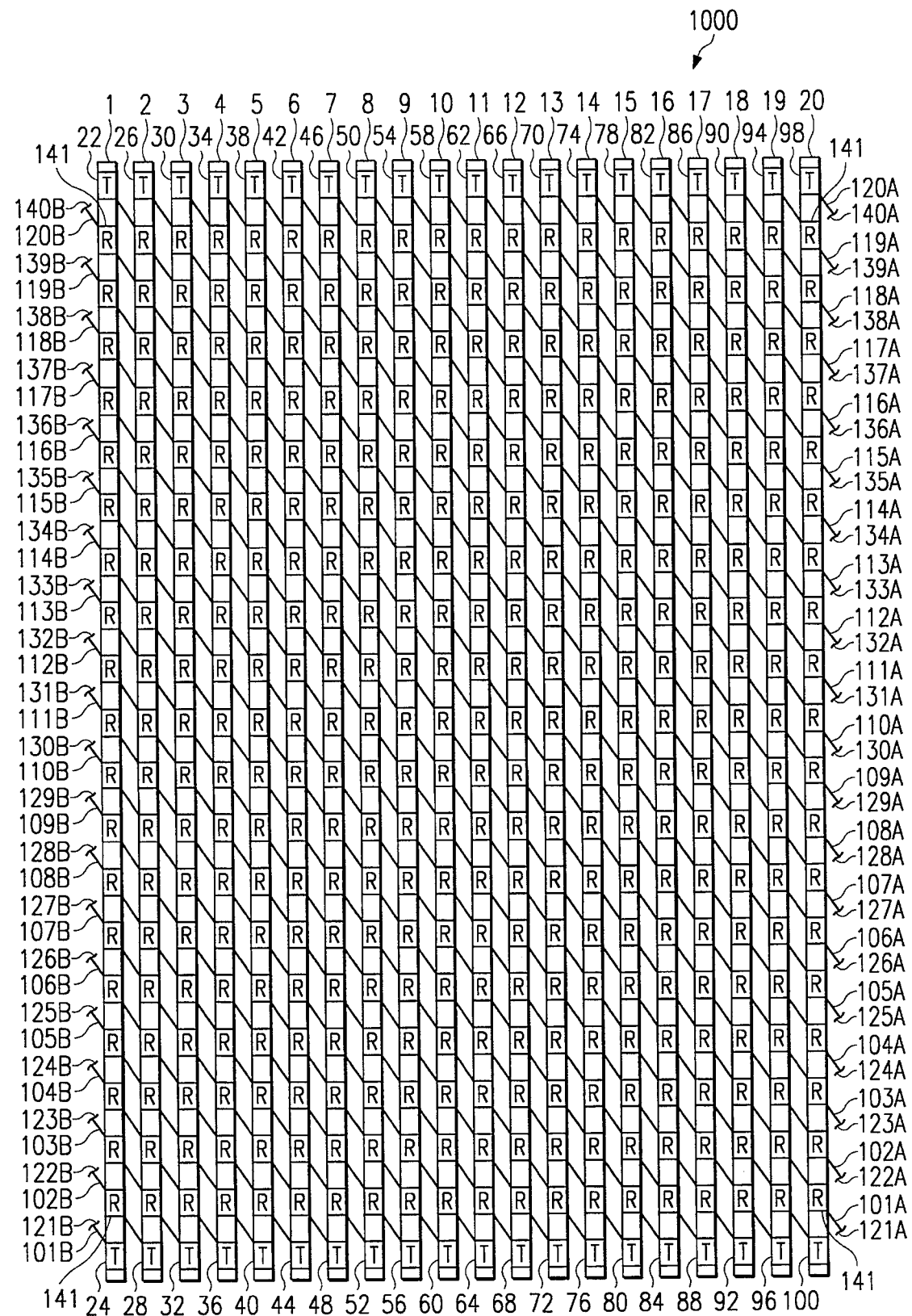
FIG. 1 is a block diagram of a diagonal bus structure in accordance with the invention.

Referring to FIG. 1, a bus system 1000 according to the invention comprises a plurality of cell buses for connection to a plurality of nodes having a transmit agent means consisting of a pair of transmit agents and a plurality of receive agents associated with each source node or card. The number of receive agents is equal to the number of bus pairs. In a specific embodiment, there is provision for 20 nodes or cards 1, 2, 3, 4, 5, 6, 7, 8, 9, 10, 11, 12, 13, 14, 15, 16, 17, 18, 19, 20, each card (for example card 1) having a first transmit agent 22 and a second transmit agent 24. There are thus forty transmit agents in pairs 22, 24; 26, 28; 30, 32; 34, 36; 38, 40; 42, 44; 46, 48; 50, 52; 54, 56; 58, 60; 62, 64; 66, 68; 70, 72; 74, 76; 78, 80; 82, 84; 86, 88; 90, 92; 94, 86; and 98, 100. Each of the transmit agents 22, 24; 26, 28; . . . ; 98, 100 is coupled at a position to one segment of a cell bus pair (101A, 101B through 120A, 120B) and terminated in matching loads (121A, 121B; 122A, 122B; . . . ; 140A, 140B). Each cell bus pair is provided with the same data by the transmit agent pair and are therefore treated as a single bus. Transmit agents are paired because the bus is always driven at an end point of a bus and from an end of a card.

Figure 2:
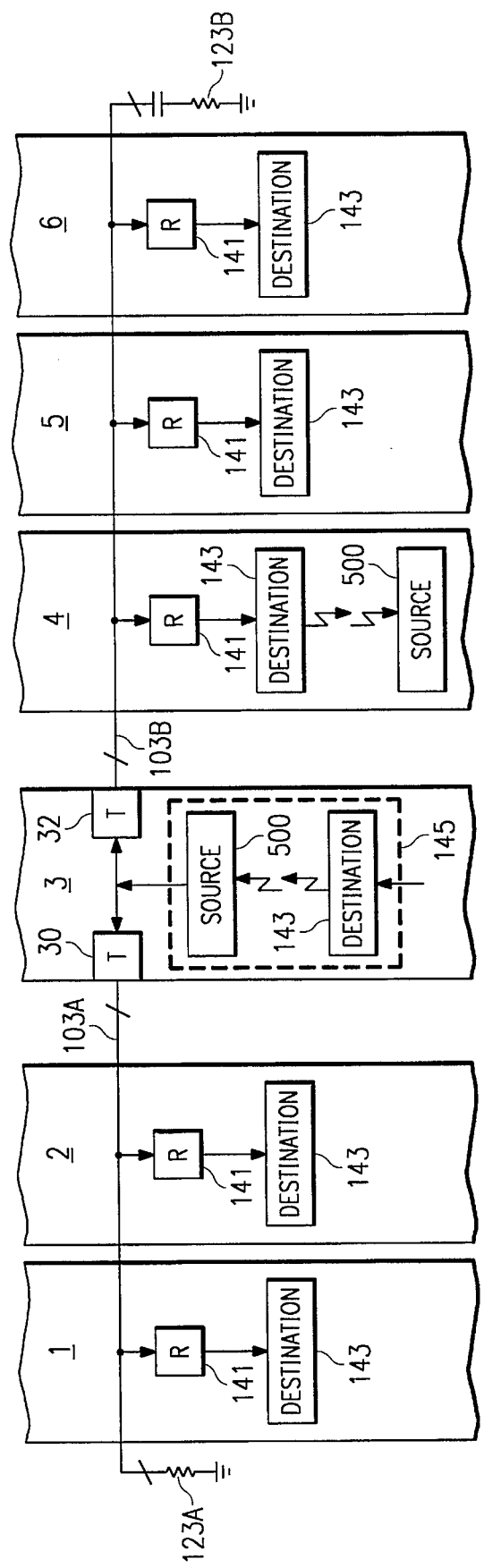
FIG. 2 is a simplified illustration of one element of the invention.

As shown more clearly in FIG. 2 in a simplified illustration of one element of the same topology as in FIG. 1, for the third card 3 as the example, each cell bus pair (103A, 103B) constitutes a cell bus (103) which is so characterized because it receives a common packet cell signal from a source 500 on the card 3 through paired transmit agents 30, 32 respectively coupled to the bus segments 103A, 103B. Each of the bus segments 103A, 103B is respectively terminated in a matching load 123A, 123B.

Referring to both FIG. 1 and FIG. 2, each card 1-20 has for example nineteen receive agents 141 for servicing a destination 143, with a single receive agent 141 coupled to one segment or cell bus of each cell bus pair 101A, 101B; ...; 120A, 120B. The coupling receive agent 141 is solely a function of card position on a backplane. In card 3, for example, the transmit agent 30 thus has sole control of bus segment 103A, and the matching transmit agent 32 has sole possession of bus segment 103B, but only one receive agent 141 on any card receives from either of the paired transmit agents 30, 32. There are receive agents for every position of every bus on a backplane. The position of the card therefore has no effect on the interception of a message transmitted from any transmit agent, and there can be no instance of interference between transmit agents on any one bus segment. The buses are all word-parallel, and the buses are physically parallel to adjacent buses in a backplane. The spacing of the connections between adjacent nodes of identical design is such that a round-trip signal path length from any first node through any transmit agent to any receive agent 141 of any second node then to its associated transmit agent and back to a receive agent of the first node is the same distance for all positions in the backplane. This topology is termed herein a diagonal bus structure, since the backplane cross connections between cards in a card cage are diagonally coupled. In theory, and under peak load, each transmit agent can transmit parallel signals as wide as the bus allows simultaneously to all cards through the respective receive agents.

Bus Organization

Figure 3:
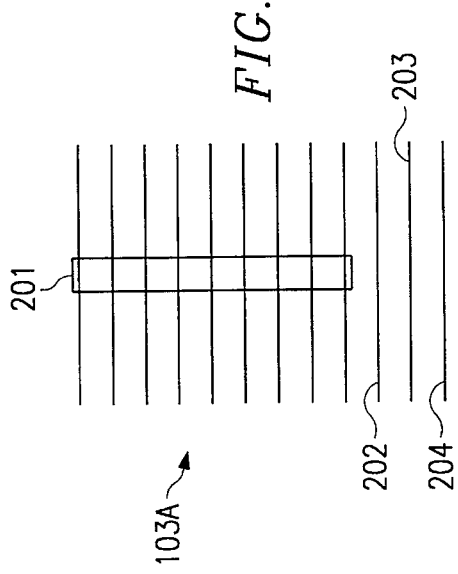
FIG. 3 is a diagram of a bus organization.

In a preferred embodiment, referring to FIG. 3, each bus, such as bus 103A, is organized as eight bits of data 201 and thus capable of receiving an octet of data each cycle. In addition the bus 103A has one parity bit line 202, a synchronization pulse line 204 and a clock line 203. At a clock rate of 25 MHz, each bus is thus capable of transferring about 200 Megabits per second. For a bus system of 20 buses, the transfer rate capacity is thus about 4 Gigabits per second.

Data Organization

Figure 4:
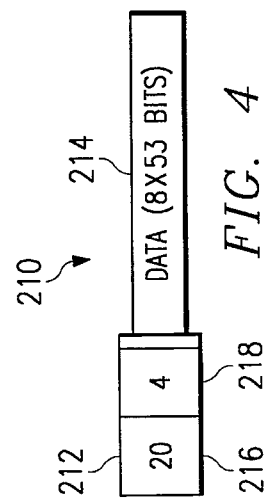
FIG. 4 is a diagram of a bus packet cell organization.

The data in the bus system is packaged and communicated in self-contained packet cells 210 (FIG. 4) with bus-system-specific address information in a header 212. The packet cells are preferably in standard ATM (asynchronous transfer mode) format of the ISDN standard and are at this level of transmission independent of any other higher-level data communications protocol which may control integrity of the content of the data received in the bus system. At this level, therefore, the protocol does not require that a packet cell so communicated be acknowledged as properly received, as this task is left to a higher layer of the governing protocol, the information for which is communicated as data in the data field in this format. Each packet cell in a specific preferred embodiment of the bus system is of a fixed length consisting of 53 octets (53×8 bits) of data in a data field 214 preceded by a header field 212 of 3 octets, 20 bits of which being for destination address information. The destination address is organized as a bit mask in a destination address field 216 and four bits are for traffic type information in a traffic type field 218. Thus, traffic can be directed to any one or a multiple of up to twenty destinations by a simple mask on the destination address field 216 and without need for a decoder. The receive agents of each node either individually or through a common destination 143 screen data using the address mask for the node. The source 500 and the destination 143 herein may be termed a communicating element.

Clock and Transmission Mode

A master clock on clock line 203 (FIG. 3) of each card 3 (FIG. 2) controls a synchronization (sync) pulse on pulse line 204 for each transmit agent, as each transmit agent serves as a head end for its own bus (103A, 103B). The sync pulse "brackets" each packet cell, and each packet cell is communicated under control of the clock associated with the transmit agent of the source card 3, which has control of one bus coupled to each of the other cards. There is no problem with unequal propagation delays since the total path lengths for a round-trip packet cell exchange is equal for any position in the backplane of the bus system. The data may therefore be communicated in the bus system without concern for clock skew.

Interface Elements

Figure 5:
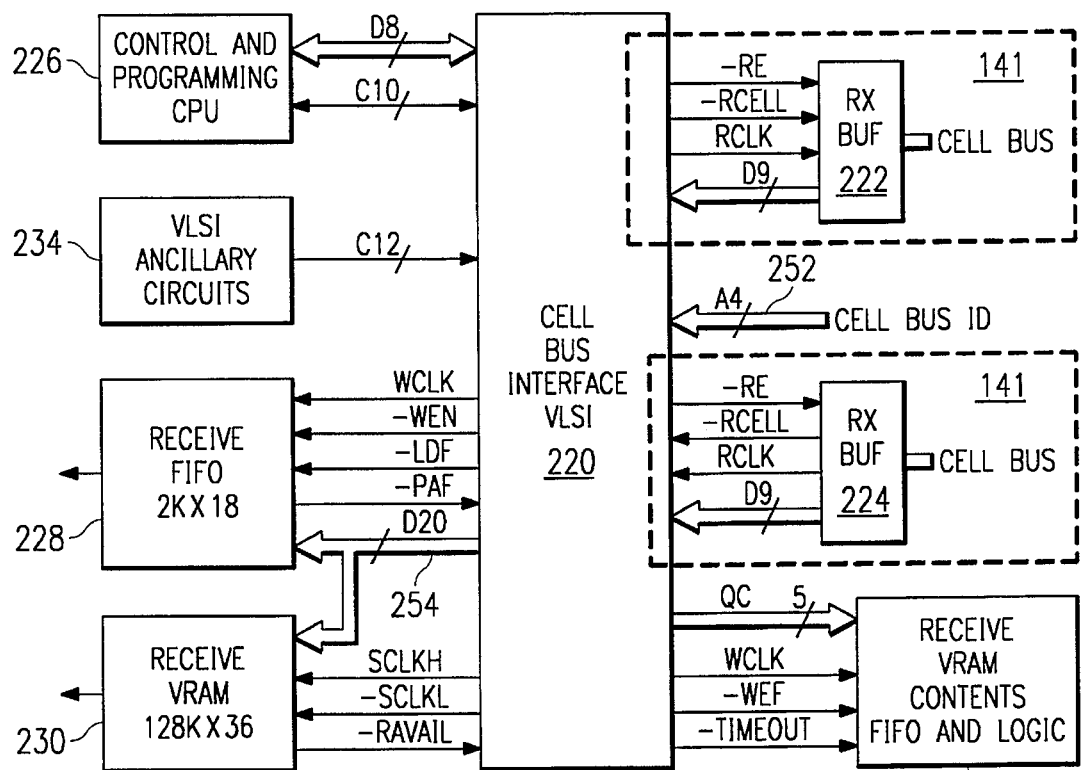
FIG. 5 is a block diagram of a plurality of receive agents illustrating a cell bus interface.

Each node in the computer system has a mechanism serviced by the bus which communicates interactively with other nodes. The mechanism is termed the communicating element. The communicating element encompasses a source 500 of data and an end point or destination 143 for data. Referring to FIG. 5, in a specific embodiment, the data reception function for each node is carried out by interface elements termed cell bus interface unit (CBI) 220 in connection with one or more receive buffers 222, 224. A receive agent 141 as herein employed comprises a single receive buffer 222 coupled to any single one of the buses 101A, 101B; ...; 120A, 120B and an associated CBI 220. A CBI may be dedicated to a single receive agent. Preferably a single CBI 220 services several receive buffers and therefore constitutes together several receive agents. The CBI directly interfaces with a control and programming CPU (CP) 226, as well as a receive FIFO (first in-first out) circuit 228, receive VRAM (Video or high speed random access memory) 230, a receive VRAM contents FIFO and associated logic 232 and various VLSI ancillary circuits 234.

The receive buffers 222, 224 receive and initially buffer data directly from one bus each of the cell buses 101A...120B. The CP 226 is used to initially configure and program the CBI 220, thereafter obtaining access to internal registers to verify and update link status and the like, as well as to control some operations.

The VLSI ancillary circuits 234 include a clock oscillator to provide a master clock source to the CBI 220. The FIFO 228 is for buffering "route-type" packet cells. The VRAM 230 is a serial buffer for buffering all valid packet cells received through the CBI 220 for relay to the end point or destination 143 (not shown). The VRAM contents FIFO 232 is used to keep track of the actual number of packet cells contained in the VRAM 230. In summary, therefore, the CBI 220 validates the data as being directed to the destination served by particular receive agent, and the receive VRAM 228 buffers and forwards the validated data to the destination. The destination (FIG. 2) then uses or processes the data and may at some point respond via a source to transmit agent means associated with same node with return traffic via a cell on a different cell bus path to the originating node.

Cell Bus Interface Module

Figure 6:
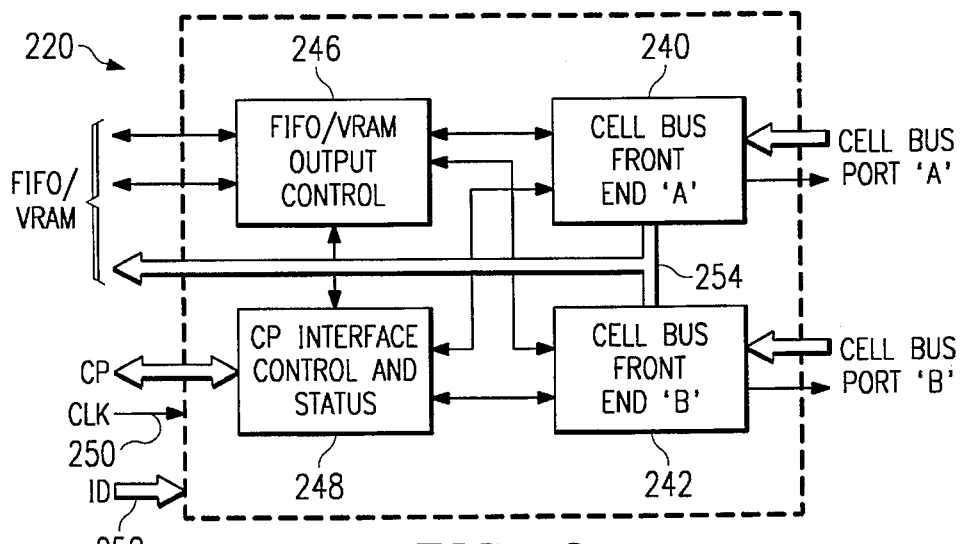
FIG. 6 is a block diagram of a cell bus interface.

Referring to FIG. 6 with FIG. 5, the CBI 220 comprises four self-contained modules operative to interact to service cell bus ports from for example receive buffers 222 and 224, to access specialized data storage and to communicate with the CP 226. The CBI, constructed as a single VLSI device, comprises at least first and second identical cell bus front end modules 240, 242, which are coupled to the receive buffers 222 and 224, respectively, a FIFO/VRAM output control module 246, which is coupled to the receive FIFO 228, the receive VRAM 230 and the receive VRAM contents FIFO and logic 232, and a CP interface, control and status module 248, which is coupled to the CP 226. An external oscillator (not shown) provides the CBI a clock source on clock lone line 250. An external ID bus 252 provides information to the CBI 220 as to the identity of the cell bus ports the CBI 220 is to service.

Each cell bus front end module 240, 242 provides the interface between the bus receiver buffers 222, 224 and the other modules 246, 248, as well as the other devices such as the FIFO 228 and VRAM 230 via a bus 254. The cell bus front end module 240, 242 provides interface functions and checks on the incoming cell data, such as cell length, parity and addressing, as well as provide temporary buffer space of up to two incoming cells.

The FIFO/VRAM output control module 246 provides the control interface between the buffers space of each cell bus front end 240, 242 and the external FIFO 228 and VRAM 230. It functions to receive transfer requests, determine which transfer request is to be serviced first, and transfer the buffered cell if the external hardware latency is below a preselected threshold (500 ns) or discard the cell with a LOSS cell indication to the CP226. The element 246 also notifies the VRAM control 232 when a preselected number of cells (sixteen) have been transferred to the VRAM 230 or when a time out period has expired and a number of cells are contained in a shift register of the VRAM 228.

The CP interface control and status module 248 provides the CP 226 with control over the operation of the CBI 220 and monitor its status via a dedicated interface, internal registers and local memory. It includes a CPU interface, a small RAM memory for readback of the value of write registers, three eight-bit counters to hold "good," "bad" and "lost" cell counts, a sixteen-bit register for data to program and test the FIFO/VRAM output control module 246, a master control register, an interrupt mask register and a status register, as well as an interrupt generation circuit and a logic block for controlling overall operation.

The modules of the CBI 220 cooperate as building blocks in support of data receiving tasks for a node in a diagonal bus system. A technically-detailed design description of the CBI 220 for a VLSI circuit is given therefor.

The invention has now been explained in reference to specific embodiments. Other embodiments will be apparent to those of ordinary skill in the art. It is therefore now intended that this invention be limited, except as indicated by the appended claims.

CELL BUS INTERFACE VLSI

1. INTRODUCTION 1.1 The Cell Bus Receiver is a VLSI module which is sued on all the LIM cards to interface with the multiple backpanel cell busses. In the prototype system, this VLSI is based on FPGA technology and can handle a maximum of two cell bus ports. However, in the final implementation, a masked gate array is to be used which will be able to handle more bus ports. The basic functions of the IC are to buffer to handle more bus ports. The basic functions of the IC are to buffer and check the incoming cell bus packets and to transfer valid received cells to the rest of the system. Incoming cells are checked for parity and length errors. The IC also provides the resident CP with control and status information on its operation and the performance of the system.

1.2 The IC system interface and functionality requirements are defined in an internal document. "LIM Cell Bus Interface VLSI-Functional & Interface Specifications", version 9, dated Oct. 15, 1991.

2. PURPOSE & SCOPE 2.1 Purpose—The purpose of this technical design specifications is to:
  define the overall VLSI circuits architecture,
  breakdown the design into self-contained modular block,
  define each individual block with sufficient accuracy that each can be designed and simulated separately or in parallel before integration, and
  provide an early evaluation mean for the feasibility of the design taking into account the ICS available.

2.2 Scope—The overall design and individual modules are defined with sufficient accuracy to allow one to proceed with the detailed design implementation and simulation on an independent basis:
  each and every one of the module interface signal is fully defined, and
  the logical functionality of each module is specified and described to a level which permits proceeding to the detailed implementation phase. The functionality of each module is illustrated using various means: block diagrams, logic equations, and timing charts or a combination thereof.

2.3 As with most projects, the detailed implementation and simulation will uncover ways to improve, modify, or correct the design specific herein. At this early project stage, these design specifications should therefore be construed with some degree of flexibility.

Figure 7:
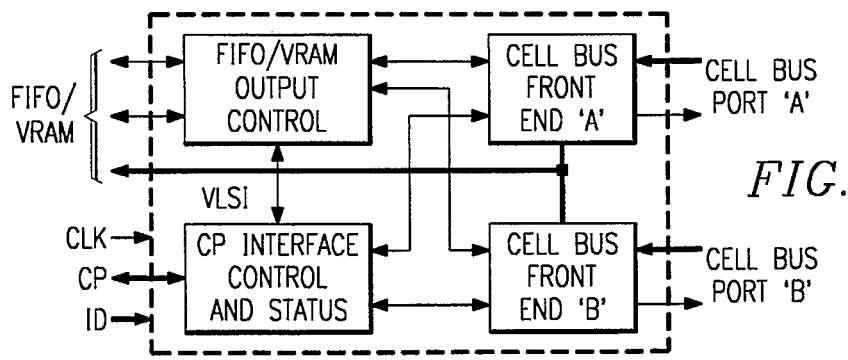
FIG. 7 is a block diagram of a Cell Bus Interface VLSI.

3. DESIGN ARCHITECTURE 3.1 General—The overall architecture breakdown of the LIM Cell Bus Interface VLSI is illustrated in FIG. 7. The design is composed of four (4) self-contained modules. Two of these modules are identical—the Cell Bus Front Ends. These modules interact together via dedicated internal control signals and busses. Externally, the CP Interface, Control, and Status module interfaces with the CP bus. The FIFO/VRAM Output Control module interface with the external FIFO and VRAM. The Cell Bus Front Ends interface respectively with the "A" and "B" cell bus ports. An external oscillator provides the IC with its internal clock source. The clock is divided internally by two to provide a true 50% duty cycle clock source. An external ID bus provides information to the IC as to the identify of the cell bus port pair it services.

3.2 Module Breakdown 3.2.1 BUS Receiver Front End—The two Cell Bus Receiver Front End modules provide the interface between the LIM bus receiver buffers and the rest of the IC modules. Besides their interface functions, the modules perform various checks on the incoming cell data: length, parity, and addressing. It also provides temporary buffers space to store up to 2 incoming cells. Section 4 provides a detailed description of the implementation of these modules.

3.2.2 FIFO/VRAM Output Control—The FIFO/VRAM Output Control Module receives requests from the two Bus Receiver Front End modules whenever a valid cell has to be transferred to the external buffers—i.e. FIFO or VRAM. The module determines to which external buffer the cell has to be transferred: FIFO or VRAM. It then proceeds to the transfer if it can be done within a certain time frame. Otherwise, it informs the CP module that a valid cell has been lost. Section 5 provides a detailed description of the implementation of this module.

3.2.3 CP Interface, Control, and Status—The CP Interface, Control, and Status module allows the CP to control the operation of the IC and gain status information on its performance. It allows the CP to command the:

enabling of each cell bus receiver, enabling of the monitoring of the performance of one of the two cell bus ports, setting of the mode of operation of the IC for normal operation or for configuration or testing: i.e. program the FIFO, test the FIFO, or test the VRAM, enabling of the general and particular interrupt facilities, and setting of the address mask that the IC will respond to for the selection of inbound cells.

It also allows the CP to gain status information on the performance of the IC:

the occurrence of parity or cell length errors on port A and B, occurrence of a counter roll-over for the good, bad, and lost cell counters, and the actual count of the good, bad, and lost cell counters.

All errors or roll-over occurrences can generate an interrupt to the CP if the IC has been programmed accordingly. Whenever the status register is read, the error bits are reset and the pending interrupt is cleared. Section 6 provides a detailed description of the implementation of this module.

4. BUS RECEIVER FRONT END 4.1 General—Each Bus Receiver Front End (BRFE) module provides the interface between its LIM bus receiver buffer and the rest of the IC. Besides its interface functions, the module performs various checks on the incoming cell data: length, parity, addressing. The IC may incorporate several BRFE modules.

4.2 Interface—The BRFE module interfaces with the external Cell Bus signals, with the Output Control module, and with the Processor Control module:

External Cell Bus:

RCLK (I): the receive cell bus clock. All cell bus signals are changed or latched on the falling edge of this clock, -RCELL (I): an incoming signal indicating when active (low) that the data on the cell bus is valid. Valid cells on the bus are 56 byte long. This signal is guaranteed to be inactive for at least one clock period between valid cells, CD[0..7] (I) : the incoming cell bus data, and DPAR (I): an incoming even parity signal for the data bus.

FIFO Output Control:

REQV (O): an output pulse which indicates to the Output Control module that a valid incoming cell is ready to be transferred to the FIFO or the VRAM, SEL (O): an output signal indicating that an inbound cell is intended for the VRAM. This signal reset the transfer time out counter.

CEO (I): an incoming signal from the Output Control module to enable the selected (SELIB/A) RAM counter to be incremented after each word transfer to the FIFO.

DOE (I): an incoming signal from the Output Control module to allow the RAM buffer data to be put onto the output data bus, and QDO-15 (O): the output data bus.

Processor Control:

REQV (O): an output pulse which indicates to the Processor Control module that a valid incoming cell was received.

REQB (O): an output pulse which indicates to the Processor Control module that an invalid (parity or length) incoming cell has been received.

Data_Bus (B): the bidirectional processor control data bus

WE_MASK (I): a write strobe from the Processor Control module allowing data on the PC data bus to be written into the ID Mask Memory, MASK_Sel (I): a multiplexer select signal from the PC module allowing when active 'I', addresses from the PC to control the ID Mask Memory. When inactive 'O', the first two addresses from counter QB are used to control the ID Mask Memory, MASK_RO-1 (I): the ID Mask Memory addresses from the PC selecting the location where the ID Mark byte present on the data bus will be written, and Note: No PC access to the ID Mask Memory should be attempted while the IC is in normal mode ($MOD_1$ & $MOD_0$ bits are '0' in MCR), otherwise invalid cells might be accepted by the system or valid cells might be rejected.

General:

MCLK (I) : the IC master clock with a frequency of 16 MHz.

Figure 8:
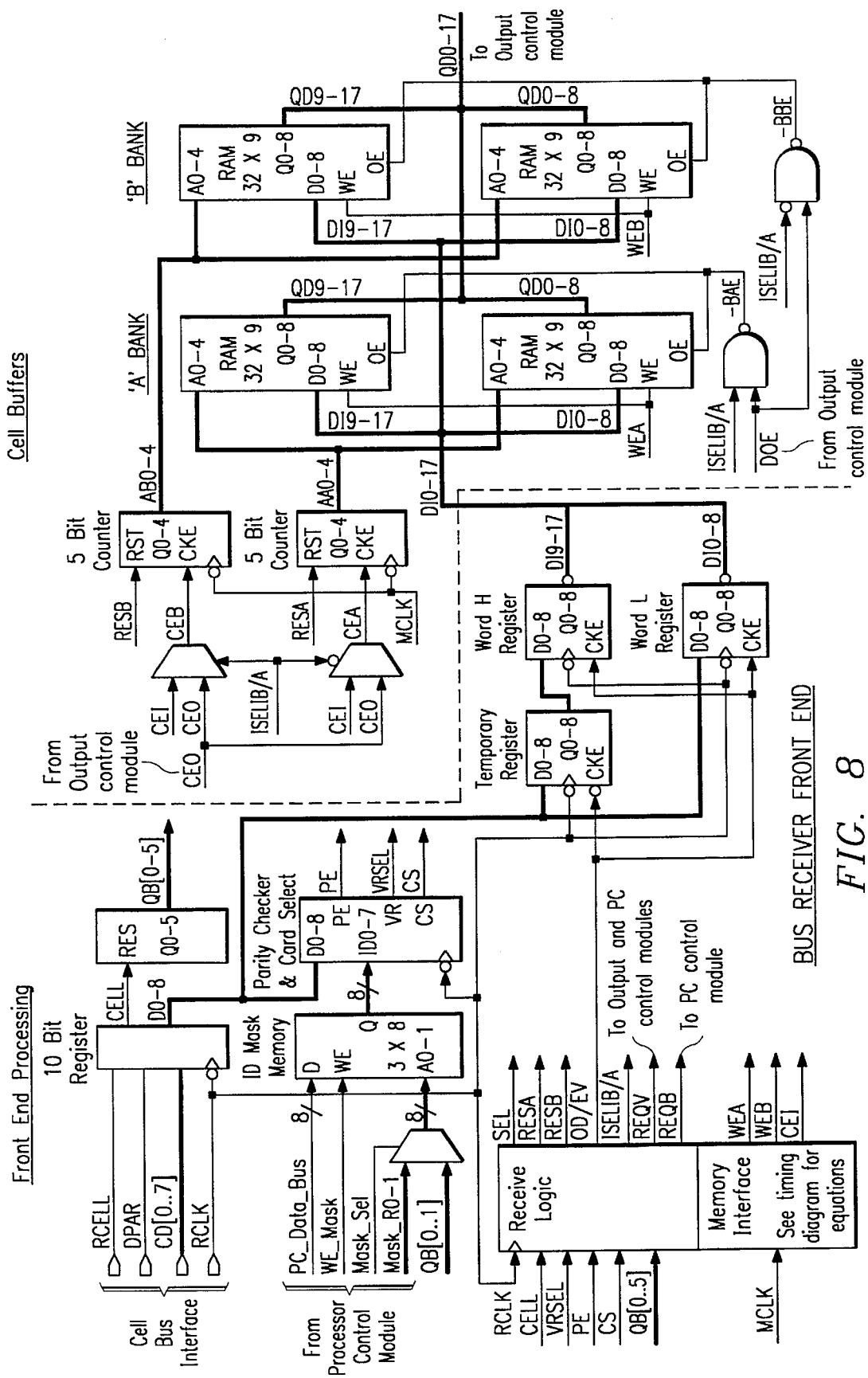
FIG. 8 is a block diagram of a bus receiver front end module.

4.3 Functional Description 4.3.1 General—The block diagram of the bus receiver front end module is illustrated in FIG. 8. It is made of two submodules: a Front End Processing sub-module and a Cell Buffers submodule. The Front End Processing sub-module is illustrated on the left side of the diagram. It operates synchronously with the receive clock (RCLK). Its purpose is to receive the incoming cell data and check whether the received data is intended for this card (address check), and to verify that the received data is valid (proper length and no parity error). The Cell Buffers sub-module provides two cell buffer memories that are used in alternance to temporarily store the incoming cell data while it is being received and checked. If the whole cell data is found valid and intended for the card, the control of the valid cell memory bank is passed to the Output Control module for transfer and the alternate bank is used to receive incoming data. This sub-module operates synchronously with the IC master clock. Logic equations for the Bus Receiver Front End Module are shown below.

OD/EV:=/(-CELL)*/(OD/EV); even odd counter, always reset to even when -CELL inactive CELL1:=(-CELL); delayed cell signal ECELL:=(-CELL)*/CELL1; end cell pulse used to trigger validity check process ECELL1:=ECELL; delayed end of cell signal LENVAL=(QB-56); cell length valid if at end of cell transmission REQV:=ECELL1*/ST0*/ST1; request to process and record valid cell reception REQB:=ECELL1*ST1; request to record bad cell reception (parity or length)

ST1.ST0.CE=(-CELL)*/CELL1

ST1=0.ST0=0; when cell valid→PER*CSEL*LENVAL

ST1=0.ST0=1; when cell not intended for card→/CSEL

ST1=1.ST0=0; when cell intended for card but call length error→CSEL*/LENVAL

ST1=1.ST0=1; when cell intended for card but parity error→CSEL*PER (length error has precedence over parity error)

LSELIB/A.CK=ECELL

LSELIB/A:=(LSELIB/A)*/STO*/ST1+(SELB/A)*(ST0+ST1); alternate between buffer A and B at end of cell when cell is valid and needs to be transferred to FIFO VRSEL1:=VRSEL;delayed VRSEL (VRAM select)

VRSEL2 :=VRSEL1; double delayed VRSEL

SEL:=VRESEL*CS*(QB-0)+VRSEL1*CS*(QB-1)+VRSEL2*CS*(QB-2); SEL is active whenever VRAM has been selected and the card is also selected.

RESA.CLK=RCLK RESA:=ECELL1*(LSELIB/A)*/STI*/ST0+/(LSELIB/A); async reset of A bank counter at the end of cell when previous cell was valid or when previous cell was not valid and A bank counter is the bank selected for input.

RESB.CLK=RCLK RESB:=ECELL1*(LSELIB/A)+/(SELIB/A)*/STi*ST0); async reset of B bank counter at the end of cell when previous cell was valid or when previous cell was not valid and B bank counter is the bank selected for input.

PER:=(PE+PER)*/(-CELL); parity error

Figure 9:
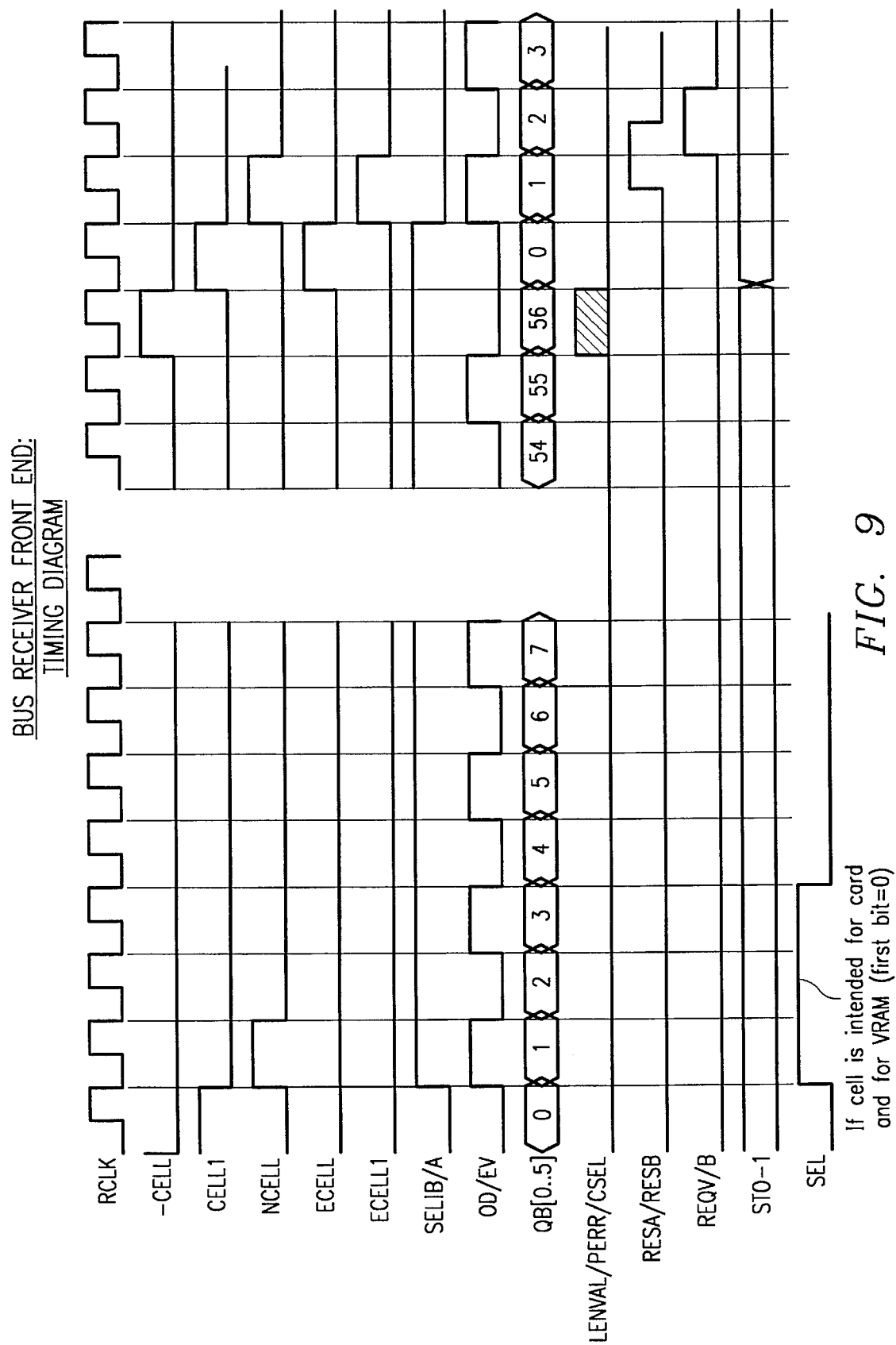
FIG. 9 is a timing diagram for the bus receiver front end module.

CSEL:=(CS*(QB-0+QB-1+QB-2)+CSEL)*/(-CELL); card select 4.3.2 Front End Processing 4.3.2.1 FIG. 9 shows a timing diagram for the Bus Receiver Front End Module. The front end data processing for the cell bus data is performed in a pipeline fashion synchronously with the cell buss receive clock (RCLK). The incoming cell bus data including CD [0 . . . 7], DPAR (even parity), and -RCELL (data valid) are latched in a 10 bit incoming register (upper left corner of the diagram) on the falling edge of the RCLK clock. At the same time the data (DI[0..7]) held in the 10 bit holding register is transferred either to the temporary register or the low byte of the word register. In the latter case, the byte in the temporary register is also transferred to the high byte of the word register. This scheme allows the incoming data to be converted from a byte wide stream to a word wide stream and provides twice the RCLK time (~250 nS) to write the data to the Cell Buffers memory. The clock enable signal OD/EV controls the operation of the temporary and word registers.

4.3.2.2 While being transferred from the receive 10 bit holding register to the temporary or word register, the data is also examined to ensure it is not corrupted (even parity error), or to check whether the data is intended for this card. In the latter case, the first three incoming cell data bytes are compared with the first three byte values stored in the ID mask memory. Anytime a set bit '1' matches in both stream of data, it is assumed the cell is intended for this card. Note: It is important that the 3 most significant bits of the first byte (add=00) of data stored in the ID Mask Memory be set to 0 to avoid false selection. If the cell is intended for this card and is to be transferred to the VRAM, a SEL pulse is generated to reset the time out counter located in the FIFO/VRAM module. A count of received bytes per cell is also maintained (QB). During the first clock period where the signal -RCELL is deactivated, the count QB must equal 56 otherwise an invalid cell is declared (invalid cell length).

4.3.2.3 During the first clock period where signal -RCELL is deactivated (period following the end of a received cell), the composite results of the address check (CSEL), of the parity check (PER), and of the cell length check (LENVAL) are encoded and latched in signals ST1 and ST0:

ST1=0, ST0=0→valid cell addressed to this location

ST1=0, ST0=1→cell not addressed to this location

ST1=1, ST0=0→cell addressed to this location but cell length error

ST1=1, ST0=1→cell addressed to this location but parity error

Note that cell length error has precedence over parity error in the encoding, Two clock periods later signal REQV or REQB is pulsed to indicate that action might have to be taken by the Output Control module if the cell was found valid and intended for this location and by the Processor Control module to record status information if the cell was intended for this location (valid or invalid). The delay in the REQV/B signal is necessary to synchronize the occurrence of this signal with signal LSELIB/A changes. See the Bus Receiver Timing Diagram shown in FIG. 9 for more details.

4.3.2.4 If the cell was valid and intended for this location, a change of buffer must take place. This change is controlled by signal LSELIB/A. When low this signal indicates that bank A buffer memory must be used for the incoming cell data. When high, bank B must be used for incoming data storage. This signal is changed only after the last word of the previous valid cell is written to memory. Because of the pipeline effect, this takes place two RCLK clock periods after the last cell byte is latched in the word register.

4.3.2.5 Every time a new cell is received, the receive counter QB must be reset to zero. This is done directly via signal -RECELL. For the memory bank address counters, the process is a bit more complex. First of all, since these counters operate with the MCLK clock, they must be reset asynchronously. The receive counter that is used with the receive bank must be reset at the beginning of reception of each new cell. The counter that is used for transferring out the data from the bank containing a valid cell must be reset only before the transfer actually takes place. Signals RESA and RESB are used for this purpose. The start point of these signals (see timing diagram) has been selected to avoid undetermined outcome because of races with the change of the LSELIB/A signal. On the other hand, the end point of this signal should not impair the increment process of the counter. The location of pulse signal REQS has also been selected to make sure the asynchronous reset signal would not interfere with the operation of the counter used to empty the buffer which is controlled by the FIFO/VRAM Output Control module. Because of this location 2 RCLK periods of latency in the transfer of data to the Output Control module are incurred. The Output Control transfer clock must compensate for this latency.

Figure 10:
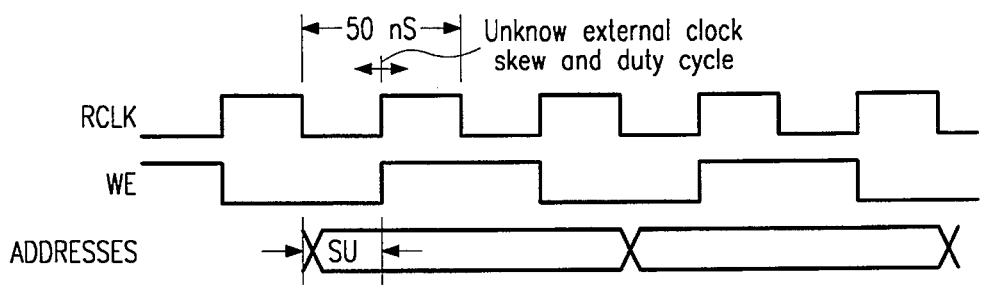
FIG. 10 is a timing diagram for an external RCLK.

4.3.2.6 Cell Buffers—Because of the way memory writes are implemented within the Xilinx 4000 family LCAs, a memory design operating synchronously with both the RCLK and MCLK clocks is difficult to be safely implemented. The problems is with meeting the necessary address set up time required taking into account the unknown skew on the edges of the RCLK signal and the unknown duty cycle of this latter signal. Because the memory needs to be operated by two different clocks (RCLK and MCLK), multiplexers have to be used to select the proper address source. This extra delay plus the unknown regarding the timing of the WE signal derived from the external RCLK clock made this design hazardous as illustrated by the timing diagram of FIG. 10 derived for a 20 MHz RCLK.

Figure 11:
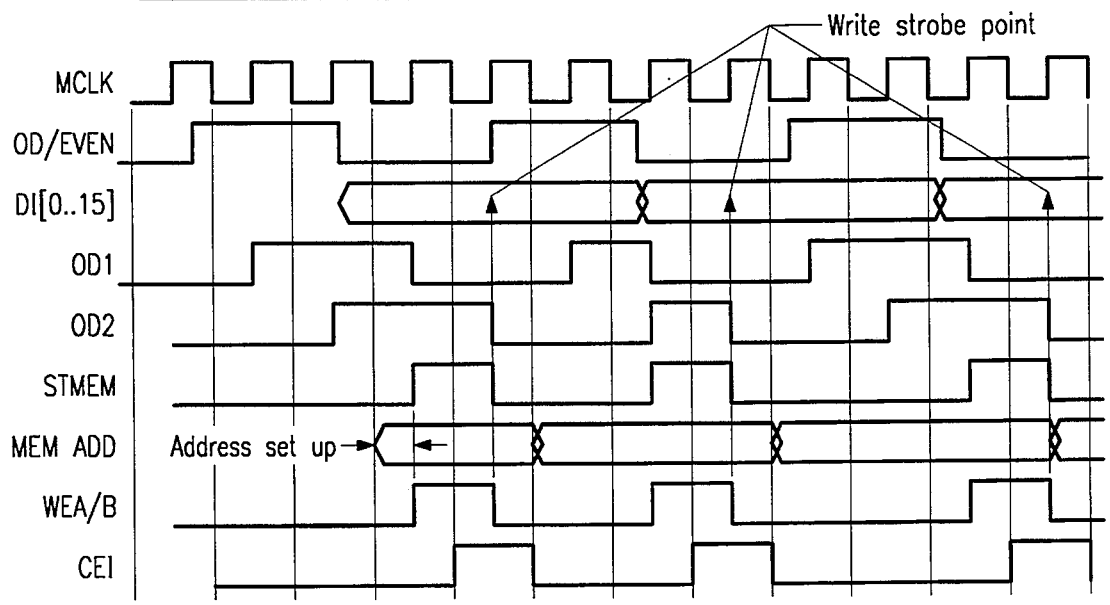
FIG. 11 is a timing diagram for a receiver memory interface.

4.3.2.7 The Cell Buffers module design was therefore made completely synchronous with the MCLK clock. To achieve this, it is necessary to synchronize the write cycle with the available of data to be written to memory. This synchronization process is done by detecting the falling edge of the OD/EV signal. Whenever the OD/EV signal goes low, a memory write cycle must take place as illustrated on the Receiver Memory Interface Timing Diagram & Logic of FIG. 11 in conjunction with the logic equations below.

LOGIC EQUATIONS

Note: MCLK=~16 MHz & RCLK=~8 MHz

OD1.CLK=/MCLK; first sync.stage OD1:=0D

OD2.CLK=/MCLK; second sync.stage OD2:=OD1

STMEM.CLK=/MCLK; start memory cycle upon STMEM:=OD2*/OD1; detection of OD falling edge WEMEM.CLK=/MCLK; initial write pulse WEMEM:= OD2*/OD1

WEA=/(SELIB/A)*WEMEM; delayed write pulse to provide more time for addresses to settle before WE WEB=(SELIB/A)*WEMEM; delayed write pulse to provide more time for addresses to settle before WE CEI.CLK=MCLK; enable to increment counter CEI:= STMEM; on next clock edge 4.3.2.8 Following a detection of a falling edge of signal OD/EV the signal STMEM (start memory cycle) is pulsed. This signal becomes active at the earliest immediately after the actual falling edge OD/EV and at the latest one MCLK period after the actual falling edge of OD/EV. Signal WEx becomes active simultaneously with STMEM except for a combinatorial delay that will ease the address set-up time before WE active requirement. This design is optimized for a MCLK frequency of ~16 MHZ and a nominal RCLK frequency of ~8 MHZ. It will operate correctly with any RCLK frequency from 0 to 12 MHZ. For faster RCLK frequency, either MCLK must be increased or the design must be pipelined (use of rising edge instead of falling edge of OD/EV). Note that the data and parity is inverted before being written to memory to match the inversion at the output of the Output Control buffers.

4.3.2.9 Each bank of memory has its own address generator (counter). Each has its own asynchronous reset signal (RESA and RESB). The generation and timing of these signals were explained in the section dealing with the Front End Processing sub-module. The clock enable of these counters (CEI from the internal Cell Buffers logic or CEO from the Output Control module) are selected by 2:1 multiplexers controlled by signal LSELIB/A. As discussed in the Front End Processing sub-module section, the signal LSELIB/A is changed at the start of a new incoming cell when the previous cell was valid (i.e. it needs to be transferred out). The timing of the LSELIB/A change is selected to have no hazardous effect on the memory write or memory read processes. Signal DOE from the Output Control module allows the data from the memory bank selected for output to appear on the Output data bus.

5. FIFO/VRAM OUTPUT CONTROL 5.1 General—The FIFO/VRAM Output Control (FVOC) module provides the control interface between the Cell Bus Front End internal buffers and the external FIFO or VRAM buffers. It receives transfer requests from the two Bus Receiver Front End modules, it determines which request it will service first, then it proceeds to the actual transfer if the external hardware latency is below 500 nS. Otherwise the cell scheduled for transfer is discarded and a LOSS cell indication is signaled to the Processor Control module. This module also informs the VRAM controller when 16 cells have been transferred to the VRAM or when the time out period has expired and a number of cells are contained in the VRAM shift register.

5.2 Interface—The FVOC module interfaces with the external FIFO/VRAM signals, with each of the Bus Receiver Front End module, and with the Processor Control module:

External FIFO:

WCLK (O): a continuous master control transfer clock which directly drives the FIFOs input port and is synchronous with the VRAM SCLKH and SCLKL serial clocks, -WEN (O): a clock enable pulse that allows the FIFOs to capture the data present at their input on the next rising edge of the WCLK clock, -LDF (O): a clock enable pulse used in conjunction with -WEN that instructs the FIFOs to capture the data present at their input on the next rising edge of the WCLK clock and use this data to program its internal features instead of passing it at their output, -PAF (I): a signal indicating when active (low) that the FIFO is not ready to accept anymore cell data.

External VRAM:

SCLKH (O): a clock signal which is active when data has to be transferred to the VRAM upper portion (D[31..16]). The VRAM will capture the data on the rising edge of SCLKH, SCLKL (O): a clock signal which is active when data has to be transferred to the VRAM lower portion (D[15..0]) and to the parity location (D[35..32]). The VRAM will capture the data on the rising edge of SCLKL.

-RAVAIL (I): an input signal which indicates whether or not the external VRAM is ready to receive serial data. When low it indicates it is ready to receive data.

External VRAM Contents FIFO:

QC[0..4] (0): an output bus indicating the number of cells contained in the VRAM shift register, -WEF (O): an enable pulse allowing the external VRAM Contents FIFO to latch the data appearing on the QC[0..4] bus, -TIMEOUT (O): an output pulse which indicates that the VRAM shift register is not full but contains data that needs to be transferred to the VRAM because there is not enough traffic to wait for complete filling of the shift register before its transfer.

Bus Receiver Front End:

REQVA (I): an input pulse which indicates that a valid incoming cell from port A is ready to be transferred to the FIFO or the VRAM, SELA (I): an input pulse indicating the presence of inbound traffic on the A bus port for the VRAM. This pulse is used to reset the time out counter, CEOA (O): an output signal to allow the selected port A RAM counter to be incremented after each word transfer to the FIFO,data to be put onto the output data bus, DOEA (O): an output signal to allow the selected port A buffer data to be put onto the data bus, REQVB (I): an input pulse which indicates that a valid incoming cell from port B is ready to be transferred to the FIFO or the VRAM, SELB (I): an input pulse indicating the presence of inbound traffic on the B bus port for the VRAM. This pulse is used to reset the time out counter.

CEOB (O): an output signal to enable the selected port B RAM counter to be incremented after each word transfer to the FIFO, DOEB (O): an output signal to allow the selected port B RAM buffer data to be put onto the output data bus, and QD0-17 (O): the FIFO/VRAM output data bus.

Processor Control:

LOSS (O): an output pulse which indicates to the Processor Control module that a valid incoming cell was loss (could not be transferred) because of excessive latency (>500 nS) from the external hardware, CPACC (I): an input pulse indicating that valid data is on the QD [15..0] bus ready to be transferred to the FIFO/VRAM.=, FIFO (I): an input signal indicating that the CP has put the IC in the FIFO test/program mode, FPROG (I): an input signal used in conjunction with the signal above that indicates that the CP has put the IC in the FIFO program mode, VRAM (I): an input signal indicating that the CP has put the IC in the VRAM test mode. Note: when neither FIFO or VRAM are asserted, the IC is assumed to be in its normal mode of operation.

QD[0..15]: (I) input signal bus that allows the CP module to write test/program data to the FIFO/VRAM. Note that parity bit will always be 0. This allows to test the external parity circuitry, if desired depending on the data value loaded.

General:

MCLK (I): the IC master clock with a frequency of ~16 MHZ.

5.3 Functional Description

Figure 12:
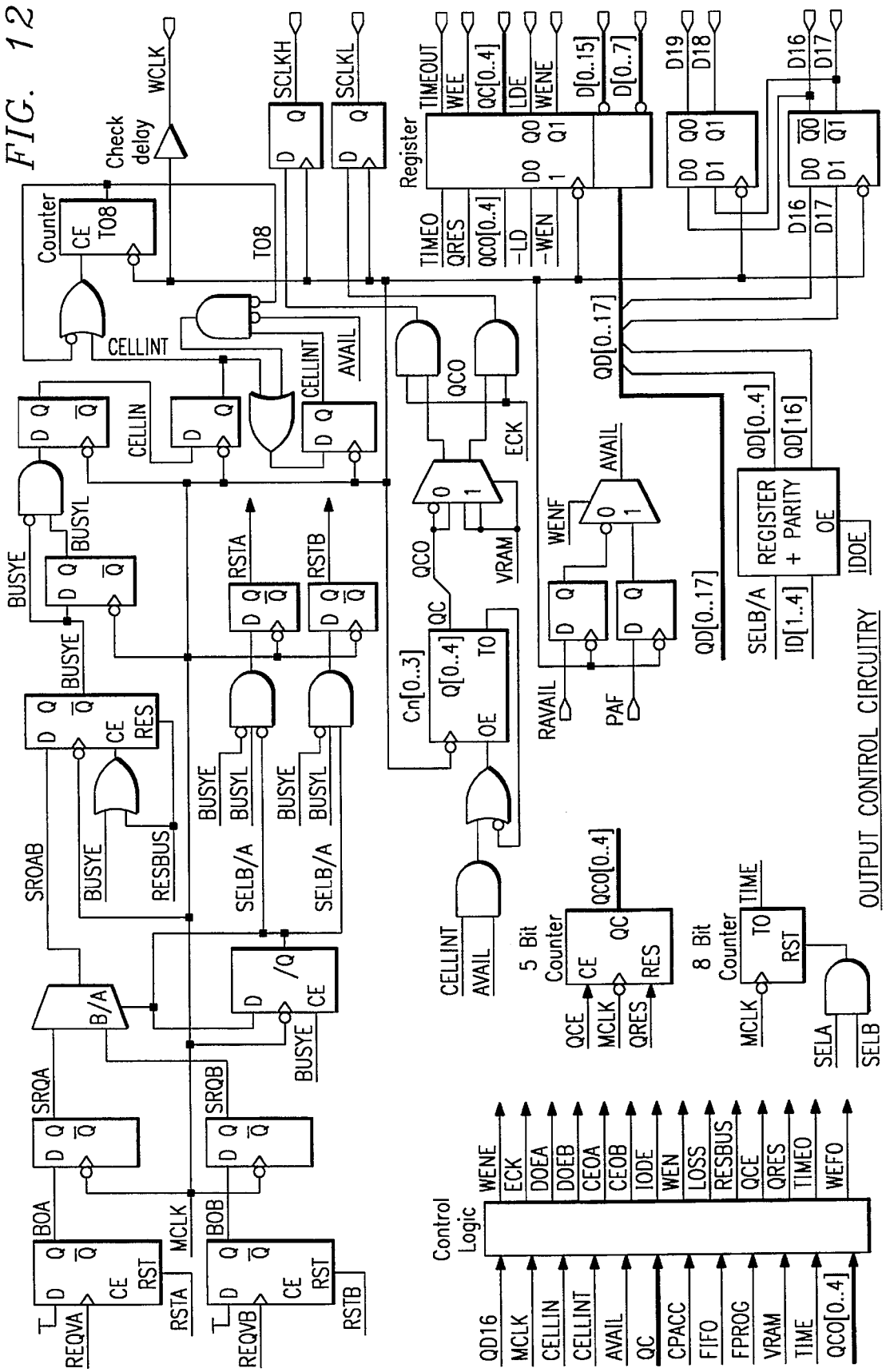
FIG. 12 is a block diagram of a FIFO/VRAM output control module.

5.3.1 General
The block diagram of the FIFO/VRAM Output Control module is illustrated in FIG. 12. Logic Equations corresponding to the FIFO/VRAM Output Control Module are given below.

LOGIC EQUATIONS

ECK.CLK=/MCLK; Enable for VRAM clocks ECK:= AVAIL*CELLINT*/WENF+/VRAM*ECK*/(QC-31)+ VRAM*CPACC DOEA.CLK=MCLK; Enable for cell buffer output A DOEA:=/(SELB/A)CELLIN+(QC-3+DOE)*/(QC-31)

DOEB.CLK=MCLK:Enable for cell buffer output B DOEB:=(SELB/A)CELLIN+(QC-3+DOE)*/(QC-31)

WENF.CLK=/MCLK;Flag for FIFO or VRAM output WENF:=QD15*CELLINT+WENF*/CELLINT

WEN.CLK=MCLK;Write FIFO enable WEN:=/ (CELLINT*WENF+WENF*/-WEN)*/(QC-31 )* FIFO*CPACC)

LD.CLK=/MCLK;Program FIFO enable LD:= PFIFO*CPACC

IDOE.CLK=/MCLK;ID register output enable IDOE:=/ (QC-2)

CEOA.CLK=/MCLK;Cell buffer output counter enable A COEA:=/(SELB/A)*(QC-3+COE)*/(QC-31)

CEOB.CLK=/MCLK;Cell buffer output counter enable B COEB:=(SELB/A)*(QC-3+COE)*/(QC-31)

LOSS.CLK=/MCLK;Loss of cell pulse LOSS:=TC8-CELLINT*/AVAIL

RESBUS.CLK=/MCLK;Read output control to be ready for RESBUS:=(QC-30); new buffer

QCE.CLK=/MCLK QCE:=(QC-30)*/WENF

QRES.CLK=/MCLK QRES:=TIME*(QCO-0)+(QCO-16)

TIME1/2 CLK=/MCLK TIME1:=TIME TIME2:=TIME1

TIMEO CLK=/MCLK TIMEO:=TIME1+TIME2

The FIFO/VRAM Output Control Module is made of three main sub-modules: an arbiter/selector, a process sequencer, and a control logic block.

5.3.2 Arbiter/Selector 5.3.2.1 The upper left portion of the design is an arbiter/ selector which:

receives requests asynchronously from each of the Cell Bus Receiver Front End, synchronizes these requests to the MCLK clock, implements a selection algorithm to choose between the A or B requests, and initiates a cell transfer process.

Figure 13:
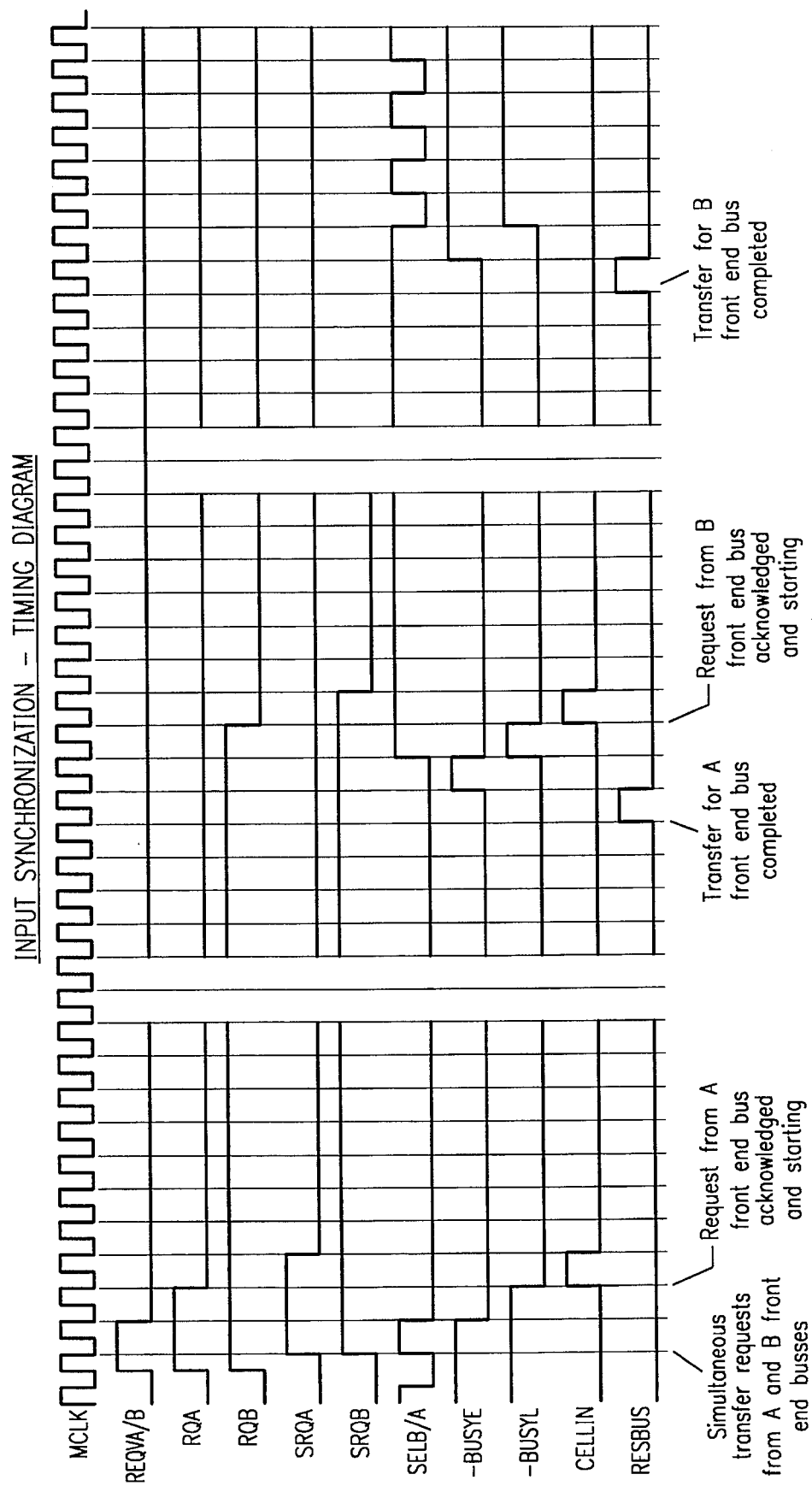
FIG. 13 is a timing diagram for input synchronization of the FIFO/VRAM output control module.

5.3.2.2 Request pulses are received from the Cell Bus Front End modules. These requests are registered in individual flip-flops, which are then synchronized by other flip-flops operating at MCLK frequencies. These requests—A and B—are then presented in alternance to a cycle selector flip-flop. Should a request be present at the input of this flip-flop, the request is latched and signal -BUSYE is asserted. This signal blocks any other request from being registered, freezes the status of SELB/A flip-flop (port being serviced), and initiates a transfer process sequence (signal CELLIN). The Input Synchronization timing diagram shown in FIG. 13 illustrates this sequence of event in the worst case situation where two transfer requests are asserted simultaneously. Note that when a transfer sequence is completed, pulse RESBUS is asserted which rest the arbiter/selector and makes it ready to start another selection/arbitration process.

5.3.3 Process Sequencer 5.3.3.1 The process sequencer generates the proper sequence of signals to transfer a complete cell buffer including overhead to the FIFO or VRAM. The timing diagram for this sequencer is shown in FIG. 14. The process starts with the assertion of the CELLIN pulse. One and two clock periods later signals -DOEx and pulse CELLINT are asserted. Pulse -DOEx is used to determine before the transfer is started if the cell bus data will be transferred to the FIFO or the VRAM. -DOEx puts the first byte of the cell on the QD bus. Signal WENF is asserted if the transfer is for the FIFO (QD15=1). It is reset otherwise (QD15=0). Although shown asserted for only one clock period, pulse CELLINT can be asserted or a maximum of 9 clock pulses (9×60=540 nS) if signal AVAIL is not asserted. Beyond that time a loss cell pulse is generated, the cell discarded, and a LOSS pulse generated for the CP. If signal AVAIL is asserted before the delay mentioned above, the cell data transferred is initiated.

5.3.3.2 If the transfer is for the FIFO, signal—WEN is asserted for the duration of the transfer. If the transfer is for the VRAM, serial cocks SCLKH and SCLKL are generated in alternance. The first four words of data are part of the overhead protocol. The first two words are zero. They are generated by letting the internal data bus float high while inverting the outputs. The third word incorporates the port bus ID. This ID (QD[8..12]) plus the related parity. (QD[17]) is driven into the data bus by output enable signal -IDOE. The fourth word is also zero. Then the last 28 words are the actual cell bus data. Note that for the VRAM, the parity bits of byte D[31-24] and byte D[23..16] appear on bus line D[35] and D[34] respectively. During the actual data transfer signals—DOEx and CEOx are enabled to allow respectively the data from the chosen cell buffer to flow onto the QD bus and to enable the chosen buffer memory address counter. At the end of the transfer signal RESBUS is generated to reset the selector/arbiter circuitry. If 16 cells have been transferred to the VRAM or a time out event occurs (16 μS without inbound VRAM intended traffic) and there is data in the VRAM shift register, the VRAM Contents FIFO is loaded with the number of cells the VRAM shift register contains. In case of a time-out, the TIME-OUT signal is also asserted.

5.3.3.3 For a CP test or program data transfer to the FIFO/VRAM, a data word is first put onto the QD[0..15] bus and a CPACC pulse is transmitted. Depending of the setting of control signals FIFO, FPROG, and VRAM, the data/program word will be written to the FIFO or VRAM. Note that no parity bits will be generated during these transfers.

6. CP INTERFACE CONTROL & STATUS

6.1 General—The CP Interface, Control, and Status (CICS) module allows the Control CPU (CP) to control the operation of the IC and supervise its status via a dedicated interface and internal registers and local memory.

6.2 Interface—The CP Interface, Control, and Status (CICS) module interfaces both with signals that are external and internal to the IC:

6.2.1 External—The external signals interface with the Control CPU (CP):

AD[0..7] (B): the multiplexed CP address and data bus,

CALE (I): the address latch enable which latches the address on its falling edge, CCS (I): a chip select signal indicating that the CP wants to communicate with the VLSI, -CRD (I): a read strobe line indicating the CP wants to proceed with a read access (valid only in conjunction with -CCS)

-CRW (I): a write strobe line indicating the CP wants to proceed with a read access (valid only in conjunction with -CCS)

-DTACK (O): an open drain output signal indicating to the CPU when activated that the VLSI is ready to complete a CP read or write access, and -CINT (O): an open collector output indicating to the CP asserted that an interrupt is pending. This signal is cleared whenever the CP reads the status register.

6.2.2 Internal—The internal signals which interface with the Control CP modules are:

Bus Receiver Front End:

REQVx (I): an input pulse from the x (A or B) Bus Receiver Front End module which indicates to the Processor Control module that a valid (good) incoming cell was received, REQBx (I); an output pulse from the x (A or B) Bus received Front End module which indicates to the Processor Control module that an invalid (parity or length) incoming cell has been received, Data_Bus (B): the bidirectional processor control data bus, WE_MASK (O): a write strobe from the Processor Control module allowing data on the PC data bus to be written into the ID Mask Memory, Mask_Sel (O): a multiplexer select signal from the PC module allowing when active '1', addresses from the PC to control the ID Mask Memory. When inactive 'O', the first two addresses from counter QB are used to control the ID Mask Memory, Mask _R0-1 (O): the ID Mask Memory addresses from the PC selecting the location where the ID Mask byte present on the data bus will be written, and Note: No PC access to the ID Mask Memory should be attempted while the IC is in normal mode ($MOD_1$ & $MOD_0$ bits are '0' in MCR), otherwise invalid cells might be accepted by the system or valid cells might be rejected.

FIFO/VRAM Output Control:

LOSS (I): an input pulse which indicates to the Processor Control module that a valid incoming cell was loss (could not be transferred) because of excessive latency (>500 nS) from the external hardware, CPACC (0): an output pulse indicating that valid data is on the QD [15..0] bus ready to be transferred to the FIFO/VRAM, FIFO (O): an output signal indicating that the CP has put the IC in the FIFO test/program mode, FPROG (O): an output signal used in conjunction with the signal above that indicates that the CP has put the IC in the FIFO program mode, +VRAM (O): an output signal indicating that the CP has put the IC in the VRAM test mode. Note: when neither FIFO or VRAM are asserted, the IC is assumed to be in its normal mode of operation, QD[0..15]: (O) output signal bus that allows the CP module to write test/program data to the FIFO/VRAM. Note that parity bit will always be 0. This allows to test the external parity circuitry, if desired depending on the data value loaded.

General:

MCLK (I): the IC master clock with a frequency of ~16 MHZ.

6.3 Functional Description

6.3.1 General—The block diagram of the Cell Bus CP Interface module is shown in FIGS. 15A and 15B. The logic equations for programming of the logic block is illustrated below. The Cell Bus CP Interface Module includes:

a CPU interface, a RAM memory to hold the value of write registers for readback purpose, three 8 bit counters to hold the good, bad, and lost cell count, a 16 bit data register to program and test the FIFO/VRAM, master control register, an interrupt mask register, a status register an interrupt generation circuit, and a logic block to control the overall operation of the circuit.

6.3.2 The CPU interface shown on the upper left corner of the diagram. This interface latches the incoming addresses and provides a bidirectional buffer with latches for the data bus.

6.3.3 The RAM memory holds a copy of the data written to the write type register. Whenever these registers are read, the contents held in the memory is provided to the CP.

6.3.4 The three 8 bit counters hold a count of the good, bad, and lost cells. The good and bad cell counters monitor the channel selected by the MONB/A bit in the MCR. Whenever the MONB/A bit is changed, these last counters are reset by signal MONCH. Whenever the counters roll over a bit (xCCR) is set in the status register and an interrupt is generated if the INENA bit is set in the MCR and the proper bit is set in the interrupt mask register.

6.3.5 The 16 bit data register allows to program and test the FIFO/VRAM. Whenever the MODx bits in the MCR are not [0,0], the content of this register is put onto the QD bus (signal -QDOE active). When the low byte of this register is written, a pulse (CPACC) is sent to the FIFO/VRAM output control module to write the whole register data into the FIFO or VRAM. The MODx bits also determine the sate of signals FIFO, PFIFO, and VRAM which will determine in the FIFO/RAM output control module the type of write that will be performed—FIFO programming, FIFO test, or VRAM test.

6.3.6 The master control register allows the CP to enable each individual receivers, to set the mode of operation of the device with the MODx signals, to select the bus port which will be monitored for good and bad cell count, and to enable interrupts in general.

6.3.7 The interrupt mask register allows the CP to individually enable each possible source of interrupt.

6.3.8 The status register allows the CP to be made aware whenever an error (parity or cell length) has been encountered in any of the two cell bus front end receiver module. Whenever an error is detected, bit ERRx is set and an interrupt is generated if enabled. Furthermore, a status is set whenever any of the three status counters rolls over. When the status register is read the set bits are cleared. Because of the asynchronous front end receive clocks, the status register could be read while an error is detected in a received cell. To prevent that this error be reset before it could be latched by the status register, errors are made available to the status register during two clock periods.

Figure 16:
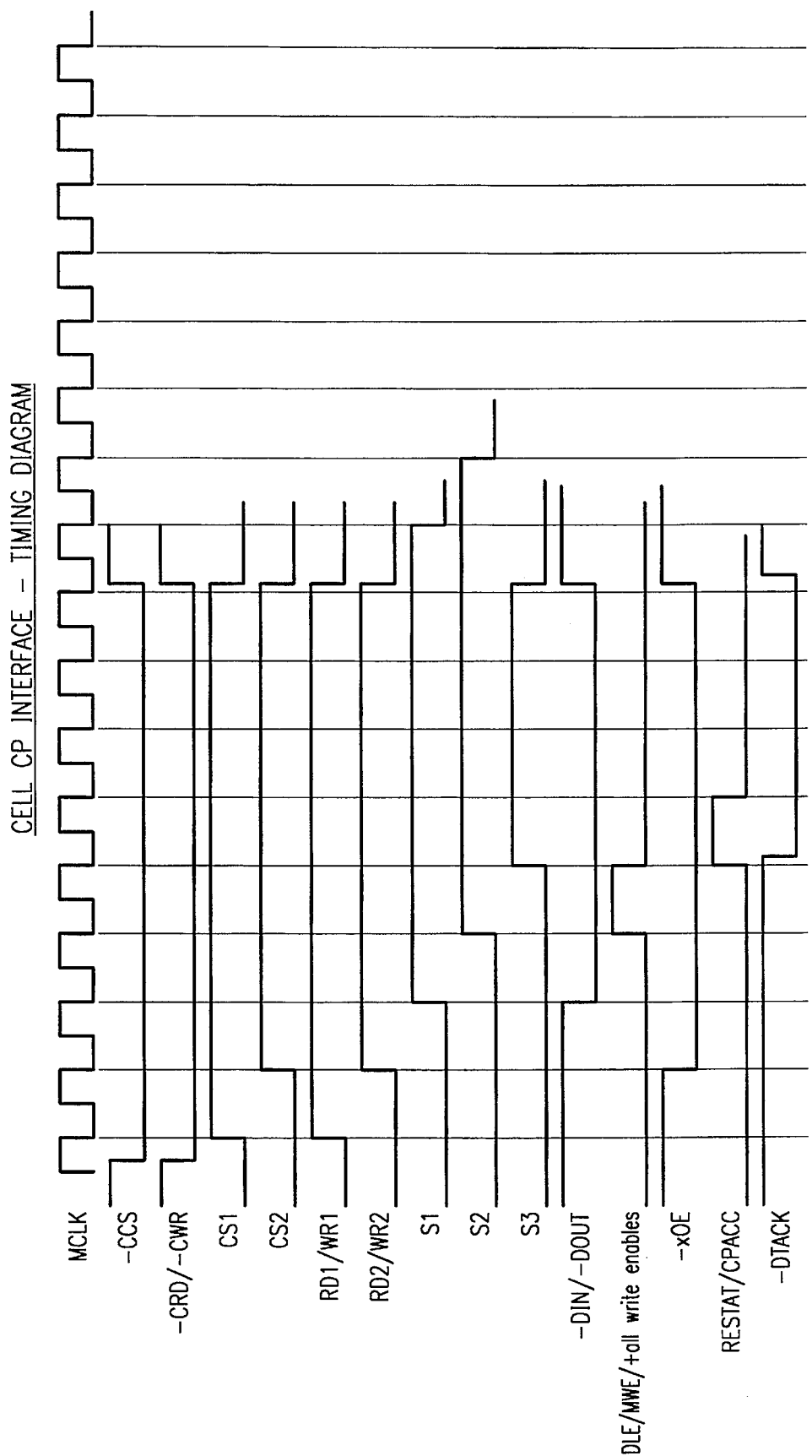
FIG. 16 is timing diagram for the Cell Bus CP Interface Module.

6.3.9 The interrupt generation circuit allows an interrupt to be generated whenever a bit is set in the status register, the general INENA bit is set in the MCR, and the selected bit(s) is (are) set in the interrupt mask register, and 6.3.10 The logic block implements all the control signals required to operate the module. The timing diagram of the main control signals is shown in FIG. 16.

LOGIC EQUATIONS—CELL BUS CP INTERFACE

```
RD1.RST = -CRD              MWE.CLK = /MCLK
RD1.CLK = /MCLK             MWE := S1*/S2*WR2
RD1 := /-CRD
                            -DTACK.OE = S3
RD2.RST = -CRD              -DTACK = S3
RD2.CLK = /MCLK
RD2 := /-CRD*RD1            -MOE = CS2*RD2*(A≠1*
                             A≠8*A≠9*A≠A)
WR1.RST = -CWR              -LCCOE = CS2*RD2*(A=A)
WR1.CLK = /MCLK
WR1 := /-CWR                -BCCOE = CS2*RD2*(A=9)
WR2.RST = -CWR              -GCCOE = CS2*RD2*(A=8)
WR2.CLK = /MCLK
WR2 := /-CWR*WR1            -STOE = CS2*RD2*(A=1)
CS1.RST = -CCS              RESTAT.MCLK = /MCLK
CS1.CLK = /MCLK             RESTAT :=
                             CS2*RD2*(A=1)*DLE
CS1 := /-CCS
                            DATAH.CLK = /MCLK
CS2.RST = -CCS              DATAH :=CS2*WR2*
                             S1*/S2*(A=6)
CS2.CLK = /MCLK
CS2 := /-CCS*CS1            DATAL.CLK = /MCLK
                            DATAL := CS2*
                             WR2*S1/S2*(A=7)
S1.CLK = /MCLK
S1 := CS2*(WR2 + RD2)       MCR.CLK = /MCLK
                            MCR := CS2*WR2*S1/S2*(A=0)
S2.CLK = /MCLK
S2 := S1                    MREG.CLK = /MCLK
                            MREG :=CS2*WR2*
                             S1/S2*(A=2)
S3.RST = -CCS
S3.CLK = /MCLK              CPACC.CLK = /MCLK
S3 :=S2                     CPACC :=
                             DATAL*(MOD1 + MOD0)
-DIN.RST = -CCS             MASK_SEL.CLK = /MCLK
-DIN.CLK '2 /MCLK           MASK_SEL :=
                             CS2*WR2*(A=3+A=4+A=5)
-DIN := WR2*CS2
                            WE_MASK.CLK = /MCLK
-DOUT.RST = -CCS            WE_MASK:=
                             CS2*WR2*(A=3 + A=
                             4 + A=5)*S1*/S2
-DOUT.CLK = /MCLK
-DOUT:= RD2*CS2             MASK_R1 = (A=5)
DLE.CLK = /MCLK             MASK_R0 = (A=4)
DLE := S1*/S2
```

What is claimed is:

1. A high-speed bus system for interconnecting communicating elements at nodes in a computer having substantially straight, elongate slots in a backplane, said elongate slots having an orientation, a communicating element being disposed at each node, the bus system in said backplane comprising:

a plurality of bus pairs, each bus pair comprising a first bus and a second bus extending from a particular node, said first bus of each bus pair extending from the particular node in a first diagonal direction with respect to the orientation of the slots, said second bus of each bus pair extending from the particular node in a second diagonal direction opposite said first diagonal direction, said first and second buses of each bus pair extending to respective terminations, said first bus and said second bus each having parallel bit lines, said parallel bit lines of said first bus and said second bus being of equal length between each and every node connection of said first bus and said second bus; and each node comprising:

a transmit agent means disposed at each node with said communicating element and associated with one of said plurality of bus pairs, said transmit agent means comprising a first transmit agent and a second transmit agent for communicating identical digital information from said communicating element to said first bus and said second bus, said first transmit agent being coupled to said first bus and said second transmit agent being coupled to said second bus of said associated one of said plurality of bus pairs; and a plurality of receive agents, said plurality of receive agents comprising a receive agent for every other node, all of said plurality of receive agents being disposed with said communicating element, each one of said receive agents being coupled to one of said first bus and said second bus to receive said digital information via said first and second transmit agents, respectively;

such that said transmit agent means transmits digital data from said communicating element to all other communicating elements via said associated one of said plurality of bus pairs and controls only said associated one of said plurality of bus pairs.

2. The bus system according to claim 1 wherein said plurality of bus pairs are provided with separate and independent clock means such that each of said plurality of bus pairs is operative independent of all other of said plurality of bus pairs.

3. The bus system according to claim 2 wherein at each node said transmit agent means and said receive agents are provided with bus couplings substantially in a row, wherein the first transmit agent is disposed at a first end, the second transmit agent is disposed at a second end and said receive agents are disposed in a row between said first transmit agent and said second transmit agent.

4. The bus system according to claim 1 wherein said transmit agent means further comprising means for transmitting, via a single bus pair, packetized word-parallel data addressable to an addressed communicating element and wherein each said receive agent further comprises intercepting means for intercepting data addressed to its associated communicating element.

5. The bus system according to claim 4 wherein each receive agent further comprises buffering means for buffering data directed to its associated communicating element.

6. The bus system according to claim 4 wherein said intercepting means includes header means for using packet header data as criteria for intercepting data address to its associated communicating element, said packet header data containing address information appended as part of a packet cell by a transmitting transmit agent.

7. The bus system according to claim 6 wherein said header means is a bit mask.

8. The bus system according to claim 1 wherein said first transmit agent and said second transmit agent are disposed at the end of said first bus and said second bus, respectively opposite said respective terminations.

9. The bus system according to claim 1 wherein said receive agent includes a control processor means, a first receive buffer for said first bus, a second receive buffer for said second bus, a first-in, first-out storage register means (FIFO), a video random access memory means (VRAM) for relaying data to said communicating, element and a plurality of cell bus interface modules sufficient for servicing each bus, said cell bus interface module comprising:

first receiving means coupled to said first receive buffer for receiving and checking incoming data;

second receiving means coupled to said second receive buffer for receiving and checking incoming data;

controlling means coupled to said first receiving means and to said second receiving means and further to said video random access memory means and to said first-in, first-out storage register means for controlling access of data to said video random access memory means and to said first-in, first-out storage register means; and means coupled to said first receiving means and to said second receiving means and further to said control processor means and said controlling means for tracking status and for programming said controlling means.

10. A cell bus interface module constructed as a single VLSI element for use in a multiple-bus system having a plurality of bus pairs, the cell bus interface module interconnecting communicating elements in a computer system having receive agents associated with each communicating element, each communicating element including a control processor means, a first receive buffer for a first bus of an associated one of the plurality of bus pairs, a second receive buffer for a second bus of the associated one of the plurality of bus pairs, a first-in, first-out storage register means (FIFO), a video random access memory means (VRAM) for relaying data to said communicating element, the cell bus interface module comprising a plurality of cell bus interfaces each associated with one of the plurality of bus pairs, each cell bus interface receiving and checking incoming data on a first bus and a second bus of an associated one of the plurality of bus pairs, each cell bus interface comprising:

first receiving means operative to be coupled to said first receive buffer for receiving and checking the incoming data on the first bus asynchronously with respect to data on other of the plurality of bus pairs;

second receiving means operative to be coupled to said second receive buffer for receiving and checking the incoming data on the second bus asynchronously with respect to data on other of the plurality of bus pairs;

controlling means operative to be coupled to said first receiving means and to said second receiving means and further to said video random access memory means and to said first-in, first out storage register means for controlling access of data to said video random access memory means and to said first-in, first out storage register means; and means coupled to said first receiving means and to said second receiving means and further to said control processor and said controlling means for tracking status and for programming said controlling means, each cell bus interface controlling an associated one of the plurality of bus pairs having a first bus extending in a first diagonal direction and a second bus extending in a second diagonal direction opposite said first diagonal direction.

* * * * *